United States Patent
Hisashi et al.

(10) Patent No.: US 6,645,629 B2
(45) Date of Patent: Nov. 11, 2003

(54) CONDUCTIVE ANTIOXIDANT PAINT AND GRAPHITE ELECTRODE

(75) Inventors: Hideyuki Hisashi, Himeji (JP); Issei Kawabata, Himeji (JP); Tatsuo Fukushima, Himeji (JP)

(73) Assignee: Mikuni Color, Ltd., Hyogo-Ken (JP)

( * ) Notice: Subject to any disclaimer, the term of this patent is extended or adjusted under 35 U.S.C. 154(b) by 0 days.

(21) Appl. No.: 09/809,749

(22) Filed: Mar. 15, 2001

(65) Prior Publication Data

US 2003/0035956 A1 Feb. 20, 2003

(51) Int. Cl.$^7$ .................................................. C09D 5/24
(52) U.S. Cl. ........................ 428/408; 252/512; 252/513
(58) Field of Search .......................... 428/408; 252/512, 252/513, 516, 519; 106/14.21, 14.44

(56) References Cited

U.S. PATENT DOCUMENTS 4,035,265 A * 7/1977 Saunders ............... 106/287.24
4,824,733 A * 4/1989 Dallaire ..................... 373/88
4,983,423 A * 1/1991 Goldsmith .................. 427/230
5,962,148 A * 10/1999 Nishimura et al. ......... 428/522

FOREIGN PATENT DOCUMENTS

| | | | | |
|---|---|---|---|---|
| GB | 2100290 | * | 6/1982 | ............ C23F/13/00 |
| JP | 74-29283 | * | 8/1974 | ............ C01B/31/04 |
| JP | 79-25256 | * | 8/1979 | ............ C09D/5/10 |
| JP | 60-251218 | * | 12/1985 | ............ C21D/1/70 |
| JP | 62-018481 | * | 1/1987 | ............ C09D/5/24 |
| JP | 07-268250 | * | 2/1991 | ............ C09D/1/00 |
| JP | 07-268249 | * | 10/1995 | ............ C09D/1/00 |
| JP | 09-100391 | * | 4/1997 | ............ C08L/59/00 |
| JP | 11-123123 | * | 5/2001 | ............ C09D/7/12 |

* cited by examiner

*Primary Examiner*—Deborah Jones
*Assistant Examiner*—Vivek Koppikar
(74) *Attorney, Agent, or Firm*—Edwards & Angell, LLP; David G. Conlin, Esq.; Richard J. Roos, Esq.

(57) ABSTRACT

There are disclosed a conductive antioxidant paint suitably used as an antioxidant material for a graphite electrode used in arc furnaces such as electric steel-making furnaces, and a graphite electrode coated with the conductive antioxidant paint.

10 Claims, No Drawings

CONDUCTIVE ANTIOXIDANT PAINT AND GRAPHITE ELECTRODE

BACKGROUND OF THE INVENTION

The present invention relates to a conductive antioxidant paint and a graphite electrode, and more particularly, to a conductive antioxidant paint especially suitable as an antioxidant material for a graphite electrode used in arc furnaces such as electric steel-making furnaces, and a graphite electrode coated with such a conductive antioxidant paint.

Hitherto, artificial graphite electrodes have been used in conventional arc furnaces such as electric steel-making furnaces. Upon the use, the graphite electrodes have been exposed to extremely severe conditions such as large electric current, high temperature, splashes of molten steel or the like. In particular, since ultrahigh-temperature arcs are generated at a tip end of the electrode, the graphite electrode has been exposed to a temperature as high as about 400 to about 3,000° C. As a result, the graphite electrode is readily oxidized and consumed by an oxidative gas entering through openings of the furnace.

In the electric steel-making furnaces, costs for the electrode used therein is very high, so that the consumed electrode leads to large economical loss. Upon the oxidation, 50 to 70% by weight of a consumed portion of the electrode is due to oxidative attack from a side surface of the electrode, and the arc itself has a less influence on the wear-out of the electrode. The wear-out of the electrode by oxidation becomes more remarkable at the position closer to the tip end thereof, so that the electrode is tapered toward the tip end, resulting in accelerated wear-out of the electrode in the longitudinal direction. Accordingly, if the oxidative attack from the side surface of the electrode is sufficiently prevented, the wear-out of the electrode can be effectively reduced with a large economical merits.

Conventionally, various methods have been proposed in order to inhibit the oxidation of the electrode. For example, there are known a method of applying to the electrode an antioxidant paint composed of a matrix containing a glazing material (frit) having a melting point of not more than 1,000° C., and refractory aggregates (Japanese Patent Application Laid-Open (KOKAI) No. 48-72211); a method of forming a non-conductive antioxidant paint layer on the surface of graphite electrode (Japanese Patent Application Laid-Open (KOKAI) No. 59-51499); a method of applying onto the electrode, a paint prepared by dispersing alumina or silica fine particles in a colloid solution containing silica ultrafine particles (Japanese Patent Application Laid-Open (KOKAI) No. 3-45583); or the like.

However, since any of these conventional paints is non-conductive, it is required that a chuck portion of the electrode is released from being coated therewith in order to ensure the current flow to the electrode. For this reason, there arise problems such as complicated coating processes, insufficient oxidation-resistant property at the uncoated portion of electrode or the like. In particular, in the method described in Japanese Patent Application Laid-Open (KOKAI) No. 48-72211, when the frit is softened at a temperature of not more than 1,000° C, the coating film undergoes shrinkage, so that film defects such as peeling-off, penetration or ruptures tend to be caused. In order to eliminate these film defects, there has been proposed a method of repeating the coating works until the thickness of the obtained coating film after melting the frit becomes as large as about 1 mm. However, in such a case, the working efficiency has been considerably deteriorated.

Further, in order to solve the above problems, there have been proposed conductive antioxidant paints of the type which can be coated even on the chuck portion of electrode by imparting a conductivity to the obtained coating film (Japanese Patent Application Laid-Open (KOKAI) Nos. 7-268248, 7-268249 and 7-268250). More specifically, Japanese Patent Application Laid-Open (KOKAI) No. 7-268248 describes a conductive antioxidant material containing a refractory aggregate, a colloidal binder and carbon black without any glass frits; Japanese Patent Application Laid-Open (KOKAI) No. 7-268249 describes a conductive antioxidant material containing a refractory aggregate, a binder and graphitized carbon black; and Japanese Patent Application Laid-Open (KOKAI) No. 7-268250 describes a conductive antioxidant material containing a refractory aggregate, a binder, carbon black and a polymer emulsion. The refractory aggregate includes oxides such as silica, alumina, titania or zirconia, and the binder includes inorganic colloid.

However, these conventional conductive antioxidant paints generate a large amount of hydrogen gas during the storage or transportation, resulting in poor storage stability thereof and breakage of a container therefor. For this reason, a long-period storage and a long-distance transportation of these paints are difficult.

In addition, in the case where the conventional conductive antioxidant paints are coated on the electrode, the obtained coating film suffers from pinholes by the hydrogen gas generated therefrom, so that the electrode tends to be burned from the pinholes. Thus, the conventional conductive antioxidant paints are deteriorated in antioxidant property when exposed to a temperature as high as not less than 1,000 ° C. As a result, the electrode is not only deteriorated in heat resistance and oxidation resistance, but also more likely to be consumed by the oxidation.

Meanwhile, it is known that the temperature within the arc furnace reaches not less than 1,000° C., thereby causing the following problems concerning the conventional conductive antioxidant paints. That is, the oxidation-resistant effect of the above paints is exhibited by a glass-like coating film formed by heat-melting film-forming components of the paints at a temperature of about 800° C. However, when the paints are heated to a temperature as high as not less than 1,000° C., the obtained glass-like coating film is unsuitably lowered in viscosity and fallen off from the surface of the electrode, resulting in a discontinuous glass-like coating film. Such discontinuous glass-like coating film fails to prevent the contact between oxygen and the electrode, thereby causing defects such as burning-in of the electrode, e.g., cissing thereon.

As a result of the present inventors' earnest studies to solve the above problems, it has been found that (1) the generation of hydrogen gas is caused when the paint has a high pH value, and is due to by the reaction between a trace amount of alkali components and impurities of the metal compound; (2) the viscosity of the glass-like coating film is lowered by melt-penetration of the alkali components into the coating film; or (3) the generation of hydrogen gas is caused by the existence of specific elements in the paint. The present invention has been attained based on the above finding.

More specifically, it has been found that the deterioration in viscosity of the glass-like coating film is due to such a phenomenon that alkali metals such as sodium and potassium or compounds thereof such as alkali metal oxides, and alkali earth metals such as calcium and magnesium or compounds thereof such as alkali earth metal oxides are melt-penetrated into the glass-like coating film after burning of carbon, and that the deteriorated viscosity of the glass-like coating film causes falling-off or separation of the coating film from the electrode, thereby adversely affecting the antioxidant effect of the electrode. In addition, it has been found that the above alkali components tend to react with the impurities of a metal compound to generate a hydrogen gas, thereby considerably deteriorating a storage stability of the paint, and that when hydrogen gas is generated during drying step of the coating film, pinholes are formed therein, so that the electrode tends to be burned from the pinholes.

SUMMARY OF THE INVENTION

An object of the present invention is to provide an improved conductive antioxidant paint which is inhibited from generating a hydrogen gas during the storage or transportation, thereby avoiding possible breakage of a container therefor and imparting an excellent storage stability, and which can prevent a graphite electrode used in arc furnace from being consumed by oxidation; and a graphite electrode which is coated with the conductive antioxidant paint.

Another object of the present invention is to provide a conductive antioxidant paint which exhibits an excellent antioxidant effect even when exposed to a temperature as high as not less than 1,000° C., and a graphite electrode which is coated with such a conductive antioxidant paint.

A further object of the present invention is to provide a conductive antioxidant paint which has an excellent storage stability, is free from pinholes when formed into a coating film, and exhibits an excellent antioxidant effect even when exposed to a temperature as high as not less than 1,000° C., and a graphite electrode which is coated with such a conductive antioxidant paint.

In a first aspect of the present invention, there is provided a conductive antioxidant paint comprising a conductive material, an antioxidant material, a polymer emulsion and an inorganic colloid as a binder, and a transition metal; and having a pH value of not more than 9.

In a second aspect of the present invention, there is provided a conductive antioxidant paint comprising a conductive material, an antioxidant material, a polymer emulsion and an inorganic colloid as a binder, and a transition metal, an alkali metal and/or alkali earth metal content being not more than 20% by weight based on the weight of the antioxidant material.

In a third aspect of the present invention, there is provided a conductive antioxidant paint comprising a conductive material, an antioxidant material and a binder; and having a total content of aluminum and silicon elements of not more than 1% by weight based on the weight of the solid content of the paint.

In a fourth aspect of the present invention, there is provided a coated graphite electrode comprising a graphite electrode coated with any of the conductive antioxidant paints described in the above aspects.

DETAILED DESCRIPTION OF THE INVENTION

First, the conductive antioxidant paint according to the present invention will be explained. The conductive antioxidant paint according to the present invention (hereinafter referred to merely as "paint") includes a conductive material, an antioxidant material and a binder, and can form a coating film or layer exhibiting a good conductivity and antioxidant effect. Therefore, the paint of the present invention is effective to prevent the oxidation of a graphite electrode when applied thereon.

Conductive Material

The conductive material used in the present invention is not particularly restricted as long as the material can impart a good conductivity to the resultant coating film. Typical examples of the conductive materials may include carbon black and graphite. These conductive materials may be used alone or in the form of a mixture thereof.

As the carbon black, there may be used those produced by any suitable methods such as a furnace method, an acetylene method, a thermal method and a contact method. Among these carbon blacks, graphitized carbon black produced by treating carbon black in a temperature of not less than 2,000° C., preferably 2,500 to 3,000° C. in such an atmosphere containing substantially no oxygen (e.g., under $N_2$ gas flow, in vacuum or in carbon powder) is preferred, and the graphitized carbon black having a divided value of crystallite thickness Lc (Å) to particle size (nm) of 1.0 to 3.0 is more preferred.

The carbon black used in the present invention preferably contains an alkali metal such as potassium and sodium and/or an alkali earth metal in an amount of not more than 1% by weight, more preferably not more than 0.5% by weight. By limiting the alkali metal and/or alkali earth metal content in carbon black to the above-specified range, it becomes possible not only to increase the ignition point of carbon black itself, but also to keep a good conductivity of the obtained coating film until reaching near 400° C. in which the chuck portion of the electrode is present.

As the graphite, there may be used any suitable commercially available products such as flake graphite, earthy graphite, artificial graphite, expanded graphite or the like. Among them, preferred graphites are those having an ash content of not more than 2% by weight, preferably not more than 1% by weight, more preferably not more than 0.5% by weight.

The content of the conductive material is usually in the range of 0.5 to 50% by weight, preferably 3 to 35% by weight based on the solid content of the paint.

When carbon black solely is used as the conductive material, the content of the carbon black is preferably 2 to 30% by weight, more preferably 5 to 20% by weight based on the weight of the solid content of the paint. When the content of the carbon black is less than 2% by weight, the obtained paint may be deteriorated in conductivity. When the content of the carbon black is more than 30% by weight, the viscosity of the obtained paint may tend to become too high, or the carbon black contained in a coating film may tend to be burnt, resulting in deteriorated antioxidant performance of the coating film.

Also, when graphite solely is used as the conductive material, the content of the graphite is preferably 0.5 to 20% by weight, more preferably 3 to 15% by weight based on the weight of the solid content of the paint. When the content of the graphite is less than 0.5% by weight, the resultant coating film may tend to be deteriorated in effect of improving the sliding property. When the content of the graphite is more than 20% by weight, the viscosity of the obtained paint may tend to become too high.

When the combination of carbon black and graphite is used as the conductive material, the content thereof lies in the above-specified range.

When the electrode is consumed during the operation of arc furnace, a fresh electrode is connected to a top of the old electrode, and an electrode holder (clamping device) mounted on the old electrode is moved in the longitudinal direction of the electrode up to a predetermined position of the fresh electrode. Upon the replacement step, a coating film formed on the fresh electrode tends to be damaged by the contact with the electrode holder. In order to prevent the coating film from being damaged (peeled) by the contact with the electrode holder, an additional amount of graphite powder may be contained in the coating film, thereby improving a sliding resistance thereof and reducing the damage thereof. The amount of the graphite powder blended is preferably 10 to 70 parts by weight, more preferably 20 to 60 parts by weight based on 100 parts by weight of the antioxidant material.

Antioxidant Material

The antioxidant material used in the present invention is not particularly restricted as long as the material can impart a required antioxidant property to the obtained coating film. Examples of the antioxidant materials may include oxides such as silica, alumina, titania and zirconia; carbides such as SiC, $B_4C$, CrC, WC, TiC, VC, ZrC and NbC, and carbides of an element selected from the group consisting of Ge, Sb, Sn and Al; nitrides such as TiN, VN, NbN and ZrN, and nitrides of an element selected from the group consisting of B, Si, Ge, Sb, Sn and Al; silicides such as $CrSi_2$, $TiSi_2$ and $ZrSi_2$; borides such as $ZrB_2$, $TiB_2$ and CrB; or a boron element as a single substance. The above oxides, carbides, nitrides, silicides and element may be used alone or in the form of a mixture of any two or more thereof.

The antioxidant materials are vitrified when exposed to a temperature as high as not less than 1,000° C. and, therefore, can be referred to as "glass-forming substance". More specifically, the antioxidant materials are gradually converted into oxides under heated condition, and form a glass-like coating film while enclosing other components such as inorganic colloid therein, so that the electrode is shielded and protected from oxygen by the thus formed film. Among the above antioxidant materials, $ZrB_2$, $B_4C$, TiC, SiC and Si are preferred because these materials can impart an excellent oxidation-resistant property to the electrode and an excellent stability to the glass-like coating film under heated condition. Further, when carbides are used as the antioxidant material, more excellent oxidation-resistant effect can be exhibited since the carbides are oxidized and serve for inhibiting oxygen from penetrating into the electrode. Among these antioxidant materials, the combination of $B_4C$ and SiC is especially preferred.

The antioxidant materials contain impurities such as aluminum or silicon in the form of a single substance (hereinafter referred to merely as "aluminum element (metal) or silicon element"). It is considered that the hydrogen gas is generated by reacting these impurities with alkali components contained in the colloidal silica used as a binder. The generation of hydrogen gas causes remarkable deterioration in storage stability of the paint, and if the hydrogen gas is generated during drying step of the coating film, pinholes are formed in the coating film, resulting in burning of the electrode from the pinholes. Therefore, the antioxidant materials are preferably pre-treated with acids such as hydrochloric acid to reduce the contents of aluminum and silicon elements therein. By reducing the contents of aluminum and silicon elements in the antioxidant materials, it is possible to inhibit the generation of hydrogen gas, enhance the keeping property of the coating solution, and prevent the formation of pinholes upon coating. The total content of aluminum and silicon elements is preferably not more than 1% by weight, more preferably not more than 0.5% by weight based on the weight of the solid content of the paint.

The acid treatment of the antioxidant materials is not particularly restricted as long as the aluminum and silicon elements can be effectively removed from antioxidant materials by preliminarily contacting the antioxidant materials with acids. For example, there may be exemplified a method wherein the acids and the antioxidant materials are mixed and stirred together. In such a case, the mixing and stirring time may be appropriately selected depending upon the amounts of the aluminum and silicon elements contained in the antioxidant materials, for example, usually not less than 10 hours, preferably 20 to 50 hours.

The acids used for the treatment is not particularly restricted as long as the aluminum and silicon elements can be reacted therewith. Specific examples of the acids may include hydrochloric acid, sulfuric acid and phosphoric acid. The acid may be used in an excess amount higher than the calculated amount based on amounts of the aluminum and silicon elements contained in the antioxidant materials.

The amount of the antioxidant material contained in the paint is usually in the range of 10 to 90% by weight, preferably 15 to 45% by weight based on the weight of the solid content of the paint. When the content of the antioxidant material is less than 10% by weight, the obtained coating film may tend to be deteriorated in stability, thereby causing cissing and, therefore, promoting the oxidation of the electrode. When the amount of the antioxidant material is more than 90% by weight, the obtained coating film may tend to be deteriorated in anchoring property. Especially, when exposed to a temperature of 400 to 800° C., the electrode undergoes oxidation due to deteriorated function of the coating film.

Binder

The binder used in the present invention is not particularly restricted as long as the material ensures a good continuity of the obtained coating film. Examples of the binders may include polymer emulsions and inorganic colloids. These binders may be used alone or in the form of a mixture of any two or more thereof.

The polymer emulsion acts as a binder capable of enhancing a continuity of the obtained coating film at a temperature between room temperature and 400° C., and improving a sliding property thereof. As such polymer emulsions, there may be exemplified rubber latexes, resin emulsions or the like. Specific examples of the polymer emulsions may include emulsions of polymers produced by emulsion polymerization, or emulsions produced by re-emulsifying these polymers.

As the rubber latexes, there may be exemplified natural rubber latexes and synthetic rubber latexes. Examples of the synthetic rubber latexes may include butadiene polymers, styrene-butadiene copolymers, acrylonitrile-butadiene copolymers, methyl methacrylate-butadiene copolymers, acrylate-based latexes or the like. Examples of the resin emulsions may include emulsions of polystyrene, styrene-acrylonitrile copolymers, polyvinyl chloride, ethylene-vinyl acetate copolymers, polymethyl methacrylate, polyethylene or the like. These synthetic rubber latexes and resin emulsions may be respectively used alone or in the form of a mixture of any two or more thereof. Among these polymer emulsions, styrene-butadiene copolymer latex is preferred, and carboxyl-containing styrene-butadiene copolymer latex is more preferred.

The inorganic colloid also functions as a binder for strongly anchoring the coating film onto the electrode at a temperature of about 400 to about 600° C. Examples of such inorganic colloids may include colloidal silica, colloidal alumina, colloidal zirconia or the like. Also, inorganic colloid precursors such as tetraethyl orthosilicate which are capable of forming inorganic colloid by adding an acid such as HCl thereto, may be used together with the acid. Among these inorganic colloids, colloidal silica is preferred. The silica particles used in the inorganic colloid preferably have an average particle size of not more than 100 nm. When the average particle size of the silica particles is more than 100 nm, the inorganic colloid may be deteriorated in functionality as a binder.

In general, the colloidal silica is synthesized by desalting water glass and, therefore, contains residual alkali components such as sodium and potassium in an amount of 1 to 10% by weight in the aqueous solution. For this reason, it is considered that when such a colloidal silica is used, the alkali components derived therefrom are reacted with the aluminum or silicon elements present in the antioxidant material to generate a hydrogen gas. As a result, it is suggested that the paint is considerably deteriorated in storage stability, and the coating film obtained therefrom suffers from pinholes due to the hydrogen gas generated upon drying of the coating film, resulting in burning of the electrode from the pinholes. Thus, in order to use such a colloidal silica in the present invention, it is preferred that the colloidal silica is further subjected to desalting treatment so as to control the concentration of the alkali components such as sodium and potassium to not more than 1% by weight, or water contained in the colloidal silica is replaced with an organic solvent such as methanol and ethylene glycol. The use of the thus pre-treated colloidal silica can inhibit the generation of hydrogen gas, enhance the storage stability of the paint, and prevent the formation of pinholes in the coating film.

The amount of the alkali metal and/or alkali earth metal contained in the inorganic colloid is preferably not more than 1% by weight, more preferably not more than 0.5% by weight.

The amount of the binder used is usually 0.05 to 40% by weight, preferably 1 to 25% by weight (calculated as solid content, i.e., residual non-volatile components produced when one gram of the binder is heated in air at 150° C. for one hour) based on the solid content of the paint.

The content of the polymer emulsion is preferably 0.05 to 10% by weight (calculated as solid content of the emulsion, i.e., residual non-volatile components produced when one gram of the emulsion is heated in air at 150° C. for one hour) based on the weight of the paint. When the content of the polymer emulsion is less than 0.05% by weight, the obtained paint may tend to be deteriorated in sliding resistance. When the content of the polymer emulsion is more than 10% by weight, the paint may tend to be deteriorated in stability with the passage of time.

The content of the inorganic colloid is preferably 1 to 30% by weight, more preferably 2 to 15% by weight (calculated as solid content of the inorganic colloid, i.e., residual non-volatile components produced when one gram of the inorganic colloid is heated in air at 150° C. for one hour) based on the weight of the paint. The content of the inorganic colloid is preferably as small as possible from the standpoint of a good conductivity. However, when the content of the inorganic colloid is less than 2% by weight, the paint exhibits substantially no adhesion force, so that the coating film obtained therefrom tends to be separated from the electrode. On the other hand, when the content of the inorganic colloid is more than 30% by weight, the paint exhibits a good adhesion force, but is deteriorated in conductivity, resulting in generation of sparks when applied on the electrode.

In the case where the combination of the polymer emulsion and the inorganic colloid is used as the binder, the content thereof lies in the above-specified range.

Other Components

The paint of the present invention may further contain a transition metal in addition to the above-described components. The transition metal has a function for enhancing a wettability of the glass-like coating film formed of the antioxidant material, relative to the electrode. More specifically, the transition metal shows an effect of increasing a wettability of the glass-like coating film relative to the surface of the graphite electrode upon vitrification of silica under a temperature of not less than 1,000° C. That is, the transition metal maintains a continuity of the glass-like coating film by uniformly wetting the surface of the graphite electrode and preventing the coating film from being separated into ball-like pieces, i.e., spheroidized.

As the transition metals, there may be used elements (metals) such as chromium, tungsten, titanium, cobalt or the like. From the standpoints of safety and inexpensiveness, the use of chromium, titanium and tungsten elements (metals) is preferred.

The amount of the transition metal blended in the paint is not less than 0.1% by weight based on the solid content of the paint, in order to exhibit an excellent effect thereof. The amount of the transition metal blended is preferably in the range of 0.1 to 70% by weight, more preferably 2 to 40% by weight, based on the weight of the solid content of the paint. When the amount of the transition metal blended is less than 0.1% by weight, the obtained vitrified coating film may tend to be deteriorated in adhesion to the graphite electrode, resulting in occurrence of cissing and, therefore, poor oxidation-resistant property. When the amount of the transition metal blended is more than 70% by weight, it may be difficult to maintain a continuity of the coating film obtained by the vitrification of aggregates or the like.

Also, the conductive antioxidant paint of the present invention may further contain antiseptic agents as well as various other additives such as defoaming agents, leveling agents, antiprecipitants or the like in order to enhance a keeping property thereof.

Next, the process for producing the conductive antioxidant paint of the present invention will be described below.

The conductive antioxidant paint of the present invention may be produced by blending the above-described components together by the following method. That is, the conductive antioxidant paint of the present invention is produced by mixing the respective components with each other in water or an organic solvent, and, if required, subjecting the obtained mixture to dispersing treatment. The amount of water or the organic solvent blended may be appropriately adjusted before coating depending on coating methods used. For example, the amount of water or the organic solvent blended is preferably 20 to 200 parts by weight, more preferably 30 to 80 parts by weight based on 100 parts by weight of the solid content of the conductive antioxidant paint.

The organic solvents usable in the present invention are not particularly restricted as long as the respective components of the paint can be dispersed therein. Specific examples of the organic solvents may include alcohol-based solvents such as methanol, isopropanol, isobutanol, isopentanol, ethylene glycol, ethylene glycol monopropyl ether, ethylene glycol monomethyl ether, ethylene glycol monobutyl ether and ethylene glycol monoethyl ether; hydrocarbon-based solvents such as n-hexane, heptane, xylene, toluene, cyclohexane, naphtha and styrene; ketone-based solvents such as acetone, methyl isobutyl ketone, methyl ethyl ketone, isophorone and acetophenone; amide-based solvents such as dimethylacetamide and methyl pyrrolidone; and ester-based solvents such as methyl acetate, ethyl acetate, isobutyl acetate, octyl acetate, acetic acid ethylene glycol monomethyl ether and acetic acid diethylene glycol monomethyl ether.

The dispersing medium used may be appropriately selected depending on the aims and environments upon use. The conductive antioxidant paint of the present invention is applied onto the electrode used under a high temperature condition. Therefore, when the coating operation is conducted near the position where the electrode is practically used, the use of less flammable organic solvents is preferred from the standpoint of inhibiting fire accidents. In this case, the content of solvents other than water is preferably controlled to as low a level as possible. For example, the content of solvents other than water. i.e., volatile solvents, is preferably not more than 10% by weight, more preferably not more than 5% by weight.

Alternatively, volatile solvents may be used to promote drying of the coating film. In such a case, the volatile solvents other than water may be contained in an amount of not less than 5% by weight, if possible, not less than 10% by weight.

The dispersing method is not particularly restricted as long as the respective components can be dispersed to a sufficient extent. For example, the dispersion treatment of a mixture composed of the above respective components may be conducted using dissolver, homomixer, ball mill, roll mill, attritor, Dyno-mill, sand mills such as pico mill, basket mill, easy mill and LMZ-SC mill, ultrasonic dispersing apparatus, homogenizers such as altimizer, nanomizer and micro fluidizer, or jet mill.

Next, properties of the conductive antioxidant paint will be described below. The conductive antioxidant paint of the present invention shows any of the following properties.

pH Value of Paint

The conductive antioxidant paint of the present invention has a pH value of not more than 9.0. Here, the pH value of the paint means a pH value measured at ordinary temperature under such a condition in which the respective components are sufficiently stirred so as not to precipitate. That is, in the present invention, the amount of the water-soluble alkali components contained in the paint is defined by the pH value. When the pH value of the paint is not more than 9.0, the amount of the water-soluble alkali components contained in the paint can be limited to an appropriate range, thereby inhibiting the generation of hydrogen gas due to the reaction with impurities contained in the metal compound. As a result, the conductive antioxidant paint of the present invention shows an excellent storage stability, can prevent the formation of pinholes when formed into a coating film, and can exhibit an excellent oxidation-resistant property even when exposed to as high a temperature as not less than 1,000° C. In order to further inhibit the generation of hydrogen gas, it is preferred that the pH value of the paint is not more than 8.5 (lower limit thereof is usually 3).

As a method of controlling the pH value of the paint to not more than 9.0, there may be used a method of appropriately selecting materials used and varying the mixing ratios therebetween, a method of converting the alkali components into salts thereof by adding acid substances thereto, a method of removing the alkali components by ion-exchange treatment, or the like.

In particular, in the case of components containing alkali metals and/or alkali earth metals, such as carbon black, inorganic colloid, etc., there may be selectively used those having a less content of these alkali components.

Content of Alkali Metals and/or Alkali Earth Metals

As to the conductive antioxidant paint of the present invention, the content of alkali metals and/or alkali earth metals is not more than 20% by weight based on the weight of the antioxidant material. By limiting the content of these alkali components based on the weight of the antioxidant material to the above range, the glass-like coating film produced from the antioxidant material at a high temperature is prevented from being deteriorated in viscosity, thereby maintaining a continuity of the glass-like coating film. As a result, the coating film produced from the paint of the present invention can exhibit an excellent oxidation-resistant property even at a temperature as high as not less than 1,000° C.

The content of the alkali metals and/or alkali earth metals as defined herein is concerned with not individual alkali contents of the respective components, but a total amount of alkali components contained in the paint based on the weight of the antioxidant material. This is because the glass-like coating film is substantially composed of the antioxidant material solely which is a residual component only present after exposed to a temperature of not less than 1,000° C., and as a result, the viscosity of the glass-like coating film is varied, i.e., influenced by the amount of alkali components contained in the glass-like coating film. In order to allow the obtained coating film to exhibit an excellent oxidation-resistant property, the content of the alkali metals and/or alkali earth metals contained in the antioxidant material is preferably not more than 15% by weight, more preferably not more than 10% by weight based on the weight of the antioxidant material.

Accordingly, in the case of components containing alkali metals and/or alkali earth metals, such as carbon black, inorganic colloid, etc., there may be selectively used those having a less content of these alkali components. The amount of the alkali metals and/or alkali earth metals contained in these components is usually not more than 1% by weight, preferably not more than 0.5% by weight.

In order to control the amount of the alkali metals and/or alkali earth metals contained in the antioxidant material to not more than 20% by weight based on the weight of the antioxidant material, the kind and mixing ratio of the antioxidant material may be appropriately selected.

Content of Aluminum and Silicon

As to the conductive antioxidant paint of the present invention, the content of aluminum and silicon elements contained in the paint is not more than 1% by weight based on the weight of the solid content of the paint.

The amounts of aluminum and silicon elements contained in the paint can be readily calculated from aluminum and silicon contents of the respective components blended, if known. Even though the aluminum and silicon contents of the respective components are not known, the amounts of aluminum and silicon elements contained in the paint can be obtained by the following method.

That is, 5 g of the paint is heated in air at 150° C. for 3 hours to measure an amount of combustion residues as the solid content thereof. In addition, a total amount of aluminum and silicon elements contained in the solid content of the paint is measured by X-ray diffraction method to obtain a weight percentage thereof based on the solid content of the paint.

By controlling the total amount of aluminum and silicon elements to not more than 1% by weight based on the solid content of the paint, it is possible to limit the amount of hydrogen gas generated from the paint to substantially ignorable level, safely store and transport the paint, and prevent the formation of pinholes when formed into a coating film. The total amount of aluminum and silicon elements contained in the solid content of the paint is preferably not more than 0.5% by weight, more preferably not more than 0.1% by weight based on the solid content of the paint, thereby further inhibiting the generation of hydrogen gas.

In order to control the total amount of aluminum and silicon elements to not more than 1% by weight based on the solid content of the paint, there may be used a method of preparing a paint by mixing the above respective components together, and then removing aluminum and silicon elements from the obtained paint. Preferably, the total amount of aluminum and silicon elements can be reduced by the method of previously removing these elements from the respective components before blending.

Formation of coating film

The conductive antioxidant paint of the present invention is applied onto the side surface and chuck portion of an electrode used in arc furnace such that the thickness of the obtained coating film is usually about 100 to about 500 μm (after drying).

The conductive antioxidant paint of the present invention may be applied by an optimum method selected from general coating methods such as an immersion-coating method, a brush-coating method, a spray-coating method, an electrostatic coating method or the like. In this case, the viscosity of the conductive antioxidant paint may be suitably controlled according to the coating method used. Also, the coating operation may be repeated a plurality of times to form an overlapped coating film. Further, different kinds of paints may be applied two or more times.

The conductive antioxidant paint of the present invention shows an excellent storage stability, prevents the formation of pinholes when formed into a coating film, and exhibits an excellent oxidation-resistant effect even when exposed to as high a temperature as not less than 1,000° C., especially not less than 1,200° C.

Also, the conductive antioxidant paint of the present invention can be applied onto s chuck portion of the electrode, and can exhibit an excellent sliding resistance as well as an excellent oxidation-resistant effect even when exposed to as high a temperature as not less than 1,000° C.

Further, the graphite electrode of the present invention is prevented from being consumed by oxidation.

EXAMPLES

The present invention will be described in more detail by reference to the following examples. However, these examples are only illustrative and not intended to limit the present invention thereto.

Examples 1 to 5 and Comparative Examples 1 to 4

First, ten pairs of paints (a) and (b) were prepared by dispersing the respective components shown in (a) and (b) of Tables 1 and 2, for 60 minutes using a sand grinder. Carbon black, colloidal silica and dispersant used in each composition are shown in Table 3.

In Comparative Example 1, an alkali component (MgO) was positively added to the composition; in Comparative Example 2, no polymer emulsion (latex emulsion) was added; in Comparative Example 3, no inorganic colloid (colloidal silica) was added; and in Comparative Example 4, no transition metal (chromium powder) was added.

Then, the paint (a) was applied in an amount of 100 to 250 g/m$^2$ (after drying) onto a whole surface of a test piece sliced from a graphite electrode by a brush-coating method, and dried for one hour. Successively, the paint (b) was applied in an amount of 250 to 500 g/m$^2$ onto the test piece. The thus obtained coated test piece was allowed to stand over night for drying, and then the surface resistivity thereof was measured by a tester. Thereafter, the test piece was allowed to stand in an ashing furnace (manufactured by Hayashi Denko Co., Ltd.) at 400° C. for 30 minutes, and the change in surface resistivity was measured. Then, the test piece was baked at 1,000° C. for 30 minutes, cooled in air to room temperature, and then observed to examine the condition of the coating film. The results are shown in Table 4.

In Examples 1 to 5, although some of the paints after baked at 1,000° C. were colored slightly green by the oxidation of chromium, it was confirmed that the paints were free from occurrence of cissing, were capable of forming a uniform coating film, and exhibited a sufficient oxidation-resistant effect.

In Comparative Example 1, the paint exhibited a very good condition upon measurement of the surface resistivity at 400° C. However, when baked at 1,000° C., a non-uniform coating film was formed, and there were observed many burnt-in portions.

In Comparative Example 2, upon measurement of the surface resistivity at 400° C., the obtained coating film was brittle, and readily fallen off from the electrode. When baked at 1,000° C. a non-uniform coating film was formed, and there were observed many burnt-in portions.

In Comparative Example 3, upon measurement of the surface resistivity at 400° C., the obtained coating film was brittle, and readily fallen off from the electrode. Further, many fractures were observed on the coating film. When baked at 1,000° C., it was confirmed that the obtained coating film was discontinuous, so that clearances were formed between the coating film and the electrode, and the electrode was severely damaged. Therefore, the paint failed to show an oxidation-resistant effect when exposed to a temperature as high as not less than 1,000° C.

In Comparative Example 4, upon measurement of the surface resistivity at 400° C., the obtained coating film was kept in a very good condition. However, when baked at 1,000° C., the coating film was discontinuous and suffered from cissing, and the electrode was damaged.

As apparent from the above, the graphite electrodes coated with the paints of the present invention still maintained a good conductivity at 400° C., and exhibited a good oxidation-resistant effect even when exposed to 1,000° C.

Examples 6 to 10 and Comparative Examples 5 to 8

First, ten pairs of paints (a) and (b) were prepared by dispersing the respective components shown in (a) and (b) of Tables 5 and 6, for 60 minutes using a sand grinder. Carbon black, colloidal silica and dispersant used in each composition are shown in Table 7.

In Comparative Example 5, colloidal silica 5 having a high sodium content was used; in Comparative Example 6, no polymer emulsion (latex emulsion) was added; in Comparative Example 7, no inorganic colloid (colloidal silica) was added; and in Comparative Example 8, no transition metal (chromium powder) was added.

Then, the paint (a) was applied in an amount of 100 to 250 g/m² (after drying) onto a whole surface of a test piece sliced from a graphite electrode by a brush-coating method, and then dried for one hour. Successively, the paint (b) was applied in an amount of 250 to 500 g/m² onto the test piece. The thus obtained coated test piece was allowed to stand over night for drying, and then the surface resistivity thereof was measured by a tester. Thereafter, the test piece was allowed to stand in an ashing furnace (manufactured by Hayashi Denko Co., Ltd.) at 400° C. for 30 minutes, and the change in surface resistivity was measured. Then, the test piece was baked at 1,000° C. for 30 minutes, cooled in air to room temperature, and then observed to examine the condition of the coating film. The results are shown in Table 8.

In Examples 6 to 10, although some of the paints after being baked at 1,000° C. were colored slightly green by the oxidation of chromium, it was confirmed that each paint was able to produce a uniform glass-like coating film without cissing, and exhibited a sufficient oxidation-resistant effect.

In Comparative Example 5, the paint generated a large amount of hydrogen gas during its storage. After being baked at 1,000° C. for 30 minutes, it was confirmed that the coating film suffered from pinholes due to the removal of hydrogen gas, and the electrode was burnt-in from the pinholes.

In Comparative Example 6, upon measurement of the surface resistivity at 400° C., the obtained coating film was brittle, and fallen off from the electrode. When being based at 1,000° C., it was confirmed that the obtained coating film was non-uniform, and there were observed many burnt-in portions on the electrode.

In Comparative Example 7, upon measurement of the surface resistivity at 400° C., the obtained coating film was brittle, and readily fallen off from the electrode. Further, many fractures were observed on the coating film. When being baked at 1,000° C., it was confirmed that the obtained coating film was discontinuous, so that clearances were formed between the coating film and the electrode, and the electrode was severely damaged. Therefore, the paint failed to show an oxidation-resistant effect when exposed to a temperature as high as not less than 1,000° C.

In Comparative Example 8, upon measurement of the surface resistivity at 400° C., the obtained coating film was kept in a very good condition. However, when being baked at 1,000° C., the coating film was discontinuous and suffered from cissing, and the electrode was damaged.

Example 11 and Comparative Example 9

First, two pairs of paints (a) and (b) were prepared by dispersing the respective components shown in (a) and (b) of Table 9, for 60 minutes using a sand grinder. Carbon black, colloidal silica, dispersant and SiC used in each composition were "#4000B" produced by Mitsubishi Kagaku Co., Ltd., "FINE CATALLOID SBB-120" (solid content: 20% by weight) produced by Shokubai Kasei Kogyo Co., Ltd., "DEMOLE N" produced by Kao Co., Ltd., and "DIASIC CF-120F." produced by Yakushima Denko Co., Ltd., respectively. The SiC had a purity of 95%, and contained as impurities, metal aluminum and silicon element in a total amount of 5% by weight.

The solid contents of the paints (a) and (b) were 67.1% by weight and 62.2% by weight, respectively. The contents of the aluminum and silicon elements were 1.48% by weight for the paint (a) and 1.33% by weight for the paint (b) based on the weight of the solid content of each paint.

In Example 11, treated SiC was used; and in Comparative Example 9, untreated SiC was used. The SiC was treated as follows. That is, equivalent amounts of SiC and 0.1N HCl were charged into a beaker, and the mixture was stirred for 24 hours. Then, the resultant mixture was stirred by "HOT PLATE & STIRRER" (tradename) manufactured by Corning Corp., to evaporate water therefrom.

The paint containing the thus treated SiC was measured by X-ray diffraction method to determine the contents of aluminum and silicon contained in the solid content of the paint. However, the contents of aluminum and silicon were less than the detection lower limit and, therefore, undetectable.

The generation of hydrogen gas from the obtained paint was continuously observed from the preparation stage thereof. The results are shown in Table 10.

Then, the paint (a) was applied in an amount of 100 to 250 g/m² (after drying) onto a whole surface of a test piece sliced from a graphite electrode by a brush-coating method, and then dried for one hour. Successively, the paint (b) was applied in an amount of 250 to 500 g/m² onto the test piece. The thus obtained coated test piece was allowed to stand over night for drying, and then the surface resistivity thereof was measured by a tester. Thereafter, the test piece was allowed to stand in an ashing furnace (manufactured by Hayashi Denko Co., Ltd.) at 400° C. for 30 minutes, and the change in surface resistivity was measured. Then, the test piece was baked at 1,000° C. 30 minutes, cooled in air to room temperature, and then observed to examine the condition of the coating film. The results are shown in Table 11.

In both of Example 11 and Comparative Example 9, although some of the paints after being baked at 1,000° C. were colored slightly green by the oxidation of chromium, it was confirmed that each paint was able to produce a uniform glass-like coating film without cissing, and exhibited a sufficient oxidation-resistant effect.

However, in Comparative Example 9, the paint suffered from the generation of hydrogen gas after the elapse of about one month. On the contrary, the paint obtained in Example 11 was free from the generation of hydrogen gas even after the elapse of one month.

TABLE 1

|  | Example 1 | | Example 2 | | Example 3 | | Example 4 | | Example 5 | |
| --- | --- | --- | --- | --- | --- | --- | --- | --- | --- | --- |
|  | a | b | a | b | a | b | a | b | a | b |
| Carbon black | 9.1 | 10.1 | 9.0 | 10.1 | 9.5 | 10.1 | 9.1 | 10.1 | 9.1 | 10.1 |
| Graphite powder | 3.3 | 1.3 | 3.3 | 15.0 | 3.3 | 10.0 | 3.3 | 1.2 | 3.3 | 13.0 |
| SiC powder | 19.8 | 16.6 | 20.0 | 15.0 | 22.0 | 12.0 | 19.8 | 15.0 | 15.0 | 18.0 |
| $B_4C$ powder | 2.0 | 12.5 | 3.0 | 15.0 | 1.5 | 20.0 | 1.9 | 13.0 | 1.8 | 14.0 |
| Latex emulsion | 1.1 | 1.2 | 1.1 | 1.0 | 1.1 | 1.0 | 1.1 | 1.0 | 1.1 | 1.0 |
| Colloidal silica 1 | 18.0 | 19.9 | — | — | — | — | — | — | — | — |
| Colloidal silica 2 | — | — | 26.2 | 29.3 | — | — | — | — | — | — |
| Colloidal silica 3 | — | — | — | — | 26.2 | 29.4 | — | — | — | — |
| Colloidal silica 4 | — | — | — | — | — | — | 29.2 | 32.6 | — | — |
| Tetraethyl orthosilicate | — | — | — | — | — | — | — | — | 5.5 | 6.0 |
| HCl (0.1 N) | — | — | — | — | — | — | — | — | 10.7 | 10.7 |
| Silica gel | — | — | — | — | — | — | — | — | — | — |
| Zirconia sol | — | — | — | — | — | — | — | — | — | — |
| Cr powder | 29.0 | 2.4 | 20.0 | 2.5 | 10 | 1.0 | 29.0 | 2.4 | 0.1 | 0.05 |
| MgO | — | — | — | — | — | — | — | — | — | — |
| Dispersant | 1.0 | 1.1 | 1.0 | 1.1 | 1.0 | 1.1 | 1.0 | 1.1 | 1.0 | 1.1 |
| Ion-exchanged water | 36.7 | 43.1 | 28.3 | 33.7 | 26.3 | 33.6 | 27.2 | 30.5 | 81.0 | 87.0 |
| Alkali/antioxidant (wt. %) | 0.56 | 0.47 | 0.66 | 0.56 | 0.65 | 0.53 | 0.73 | 0.59 | 0.59 | 0.34 |

Note: The values in Table represent "part by weight" unless otherwise specified.

TABLE 2

|  | Comparative Example 1 | | Comparative Example 2 | | Comparative Example 3 | | Comparative Example 4 | |
| --- | --- | --- | --- | --- | --- | --- | --- | --- |
|  | a | b | a | b | a | b | a | b |
| Carbon black | 9.1 | 10.1 | 9.1 | 10.1 | 9.1 | 10.1 | 9.1 | 10.1 |
| Graphite powder | 3.3 | 1.3 | 3.3 | 1.3 | 3.3 | 1.3 | 3.3 | 1.3 |
| SiC powder | 19.8 | 16.6 | 19.8 | 16.6 | 19.8 | 16.6 | 19.8 | 16.6 |
| $B_4C$ powder | 2.0 | 12.5 | 2.0 | 12.5 | 2.0 | 12.5 | 2.0 | 12.5 |
| Latex emulsion | 1.1 | 1.2 | — | — | 1.1 | 1.2 | 1.1 | 1.2 |
| Colloidal silica 1 | 18.0 | 19.9 | 18.0 | 19.9 | — | — | 18.0 | 19.9 |
| Colloidal silica 2 | — | — | — | — | — | — | — | — |
| Colloidal silica 3 | — | — | — | — | — | — | — | — |
| Colloidal silica 4 | — | — | — | — | — | — | — | — |
| Tetraethyl orthosilicate | — | — | — | — | — | — | — | — |
| HCl (0.1 N) | — | — | — | — | — | — | — | — |
| Silica gel | — | — | — | — | 5.5 | 6.0 | — | — |
| Zirconia sol | — | — | — | — | — | — | — | — |
| Cr powder | 29.0 | 2.4 | 29.0 | 2.4 | 29.0 | 2.4 | — | — |
| MgO | — | — | — | — | — | — | 9.1 | 10.1 |
| Dispersant | 1.0 | 1.1 | 1.0 | 1.1 | 1.0 | 1.1 | 1.0 | 1.1 |
| Ion-exchanged water | 36.7 | 43.1 | 36.7 | 43.1 | 36.7 | 43.1 | 36.7 | 43.1 |
| Alkali/antioxidant (wt. %) | 25.6 | 20.8 | 0.56 | 0.47 | 0.38 | 0.38 | 0.56 | 0.47 |

Note: The values in Table represent "part by weight" unless otherwise specified.

TABLE 3

|  | Solvent | Average particle size (nm) | Content of alkali metal or alkali earth metal (wt. %) | Product and maker |
| --- | --- | --- | --- | --- |
| Carbon black | — | — | ≧0.1 | "#4000B" produced by Mitsubishi Chemical Corp. |
| Colloidal silica 1 | Methanol | 10 to 20 | 0.13 | "METHANOL SILICA SOL" produced by Nissan Kagaku Co., Ltd. |
| Colloidal silica 2 | water | 10 to 20 | 0.2 | "SNOWTEX O" produced by Nissan Kagaku Co., Ltd. |
| Colloidal silica 3 | water | about 50 | 0.2 | "SNOWTEX OL" produced by Nissan Kagaku Co., Ltd. |
| Colloidal silica 4 | water | about 100 | 0.15 to 0.2 | "SPHERICA-SLURRY 120" produced by Shokubai Kasei Kogyo Co., Ltd. |
| Dispersant (Na salt of formalin condensate of β-naphthalene sulfonic acid | — | — | 10 | "DEMOLE" produced by Kao Co., Ltd. |

TABLE 4

|  | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Surface resistivity (Ω) after coating | 3 | 4 | 4 | 2 | 3 | 13 | 3 | 8 | 2 |
| Surface resistivity (Ω) after treated at 400° C. for 30 min. | 2 | 2 | 2 | 2 | 3 | 12 | 2 | 5 | 2 |
| Condition after baked at 1,000° C. for 30 min. | ○ | ○ | ○ | ○ | ○ | X | X | X | X |

Note: The evaluation results of the condition after baked at 1,000° C. for 30 min. are classified into the following ranks:
○: Covered by a continuous coating film without any change; and
X: Damaged by cissing or the like

TABLE 5

|  | Example 6 | | Example 7 | | Example 8 | | Example 9 | | Example 10 | |
|---|---|---|---|---|---|---|---|---|---|---|
|  | a | b | a | b | a | b | a | b | a | b |
| Carbon black | 9.1 | 10.1 | 9.0 | 10.1 | 9.5 | 10.1 | 9.1 | 10.1 | 9.1 | 10.1 |
| Graphite powder | 3.3 | 1.3 | 3.3 | 15.0 | 3.3 | 10.0 | 3.3 | 1.2 | 3.3 | 13.0 |
| SiC powder | 19.8 | 16.6 | 20.0 | 15.0 | 22.0 | 12.0 | 19.8 | 15.0 | 15.0 | 18.0 |
| $B_4C$ powder | 2.0 | 12.5 | 3.0 | 15.0 | 1.5 | 20.0 | 1.9 | 13.0 | 1.8 | 14.0 |
| Latex emulsion | 1.1 | 1.2 | 1.1 | 1.0 | 1.1 | 1.0 | 1.1 | 1.0 | 1.1 | 1.0 |
| Colloidal silica 1 | 18.0 | 19.9 | — | — | — | — | — | — | — | — |
| Colloidal silica 2 | — | — | 26.2 | 29.3 | — | — | — | — | — | — |
| Colloidal silica 3 | — | — | — | — | 26.2 | 29.4 | — | — | — | — |
| Colloidal silica 4 | — | — | — | — | — | — | 29.2 | 32.6 | — | — |
| Colloidal silica 5 | — | — | — | — | — | — | — | — | — | — |
| Tetraethyl orthosilicate | — | — | — | — | — | — | — | — | 5.5 | 6.0 |
| HCl (0.1 N) | — | — | — | — | — | — | — | — | — | — |
| Silica gel | — | — | — | — | — | — | — | — | — | — |
| Zirconia sol | — | — | — | — | — | — | — | — | — | — |
| Cr powder | 29.0 | 2.4 | 20.0 | 2.5 | 10 | 1.0 | 29.0 | 2.4 | 0.1 | 0.05 |
| Dispersant | 1.0 | 1.1 | 1.0 | 1.1 | 1.0 | 1.1 | 1.0 | 1.1 | 1.0 | 1.1 |
| Ion-exchanged water | 36.7 | 43.1 | 28.3 | 33.7 | 26.3 | 33.6 | 27.2 | 30.5 | 81.0 | 87.0 |
| Alkali/antioxidant (wt. %) | 0.56 | 0.47 | 0.66 | 0.56 | 0.65 | 0.53 | 0.73 | 0.59 | 0.59 | 0.34 |
| pH value | 7.2 | 7.0 | 7.3 | 7.2 | 7.5 | 7.3 | 7.5 | 6.4 | 6.0 | 4.8 |

Note: The values in Table represent "part by weight" unless otherwise specified.

TABLE 6

|  | Comparative Example 5 | | Comparative Example 6 | | Comparative Example 7 | | Comparative Example 8 | |
|---|---|---|---|---|---|---|---|---|
|  | a | b | a | b | a | b | a | b |
| Carbon black | 9.1 | 10.1 | 9.1 | 10.1 | 9.1 | 10.1 | 9.1 | 10.1 |
| Graphite powder | 3.3 | 1.3 | 3.3 | 1.3 | 3.3 | 1.3 | 3.3 | 1.3 |
| SiC powder | 19.8 | 16.6 | 19.8 | 16.6 | 19.8 | 16.6 | 19.8 | 16.6 |
| $B_4C$ powder | 2.0 | 12.5 | 2.0 | 12.5 | 2.0 | 12.5 | 2.0 | 12.5 |
| Latex emulsion | 1.1 | 1.2 | — | — | 1.1 | 1.2 | 1.1 | 1.2 |
| Colloidal silica 1 | 18.0 | 19.9 | 18.0 | 19.9 | — | — | 18.0 | 19.9 |
| Colloidal silica 2 | — | — | — | — | — | — | — | — |
| Colloidal silica 3 | — | — | — | — | — | — | — | — |
| Colloidal silica 4 | — | — | — | — | — | — | — | — |
| Colloidal silica 5 | 25.9 | 29.0 | — | — | — | — | — | — |
| Tetraethyl orthosilicate | — | — | — | — | — | — | — | — |
| HCl (0.1 N) | — | — | — | — | — | — | — | — |
| Silica gel | — | — | — | — | 5.5 | 6.0 | — | — |
| Zirconia sol | — | — | — | — | — | — | — | — |
| Cr powder | 29.0 | 2.4 | 29.0 | 2.4 | 29.0 | 2.4 | — | — |
| Dispersant | 1.0 | 1.1 | 1.0 | 1.1 | 1.0 | 1.1 | 1.0 | 1.1 |
| Ion-exchanged water | 36.7 | 43.1 | 36.7 | 43.1 | 36.7 | 43.1 | 36.7 | 43.1 |
| Alkali/antioxidant (wt. %) | 1.65 | 1.37 | 0.56 | 0.47 | 0.38 | 0.38 | 0.56 | 0.47 |
| pH value | 9.8 | 9.7 | 7.0 | 6.8 | 7.2 | 7.1 | 7.2 | 7.1 |

Note: The values in Table represent "part by weight" unless otherwise specified.

TABLE 7

|  | Solvent | Average particle size (nm) | Content of alkali metal or alkali earth metal (wt. %) | Product and maker |
|---|---|---|---|---|
| Carbon black | — | — | ≧0.1 | "#4000B" produced by Mitsubishi Chemical Corp. |
| Colloidal silica 1 | Methanol | 10 to 20 | 0.13 | "METHANOL SILICA SOL" produced by |

TABLE 7-continued

| | Solvent | Average particle size (nm) | Content of alkali metal or alkali earth metal (wt. %) | Product and maker |
|---|---|---|---|---|
| Colloidal silica 2 | water | 10 to 20 | 0.2 | Nissan Kagaku Co., Ltd. "SNOWTEX O" produced by Nissan Kagaku Co., Ltd. |
| Colloidal silica 3 | water | about 50 | 0.2 | "SNOWTEX OL" produced by Nissan Kagaku Co., Ltd. |
| Colloidal silica 4 | water | about 100 | 0.15 to 0.2 | "SPHERICA-SLURRY 120" produced by Shokubai Kasei Kogyo Co., Ltd. |
| Colloidal silica 5 | water | ≧10 | 1 | "CATALLOID 550" produced by Shokubai Kasei Kogyo Co., Ltd. |
| Dispersant (Na salt of formalin condensate of β-naphthalene sulfonic acid | — | — | 10 | "DEMOLE" produced by Kao Co., Ltd. |

TABLE 8

| | Ex. 6 | Ex. 7 | Ex. 8 | Ex. 9 | Ex. 10 | Com. Ex. 5 | Com. Ex. 6 | Com. Ex. 7 | Com. Ex. 8 |
|---|---|---|---|---|---|---|---|---|---|
| Surface resistivity (Ω) after coating | 3 | 4 | 4 | 2 | 3 | 4 | 3 | 8 | 2 |
| Surface resistivity (Ω) after treated at 400° C. for 30 min. | 2 | 2 | 2 | 2 | 3 | 2.5 | 2 | 5 | 2 |
| Condition after baked at 1,000° C. for 30 min. | ○ | ○ | ○ | ○ | ○ | X | X | X | X |

Note: The evaluation results of the condition after baked at 1,000° C. for 30 min. are classified into the following ranks:
○: Covered by a continuous coating film without any change; and
X: Damaged by cissing or the like

TABLE 9

| | Example 11 | | Comparative Example 9 | |
|---|---|---|---|---|
| | a | b | a | b |
| Carbon black | 9.1 | 10.1 | 9.1 | 10.1 |
| Graphite powder | 3.3 | 13.0 | 3.3 | 13.0 |
| SiC powder (treated) | 19.8 | 16.6 | — | — |
| SiC powder (untreated) | — | — | 19.8 | 16.6 |
| $B_4C$ powder | 1.9 | 12.5 | 1.9 | 12.5 |
| Latex emulsion | 1.1 | 1.2 | 1.1 | 1.2 |
| Colloidal silica | 23.2 | 26.0 | 23.2 | 26.0 |
| Cr powder | 29.3 | 2.5 | 29.3 | 2.5 |
| Dispersant | 1.0 | 1.1 | 1.0 | 1.1 |
| Ion-exchanged water | 11.3 | 17.0 | 11.3 | 17.0 |

Note: The values in Table represent "part by weight" unless otherwise specified.

TABLE 10

| | After one day | After one week | After one month |
|---|---|---|---|
| Example 11 | ○ | ○ | ○ |
| Comparative Example 9 | ○ | ○ | X |

Note:
○: No hydrogen gas generated; and
X: Hydrogen gas generated.

TABLE 11

| | Example 11 | Comparative Example 9 |
|---|---|---|
| Surface resistivity (Ω) after coating | 2 | 3 |
| Surface resistivity (Ω) after treated at 400° C. for 30 min. | 2 | 3 |
| Condition after baked at 1,000° C. for 30 min. | ○ | ○ |

Note: The evaluation results of the condition after baked at 1,000° C. for 30 min. are classified into the following ranks:
○: Covered by a continuous coating film without any change; and
X: Damaged by cissing or the like

What is claimed is:

1. A graphite electrode coated with a conductive antioxidant paint comprising a conductive material, an antioxidant material, a polymer emulsion and an inorganic colloid as a binder, and a transition metal; and having a pH value of not more than 9.

2. A graphite electrode according to claim 1, wherein said antioxidant material is previously oxidized.

3. A graphite electrode according to claim 1, wherein said antioxidant material is a carbide or nitride of an element selected from the group consisting of B, Si, Ge, Sb, Ti, Sn, Al, Zr, a boron element and a silicon element.

4. A graphite electrode according to claim 1, wherein said inorganic colloid has an average particle size of not more than 100 nm.

5. A graphite electrode according to claim 1, wherein said transition metal is at least one element selected from the group consisting of Cr, W, Co, Ti and Ni.

6. A graphite electrode coated with a conductive antioxidant paint comprising a conductive material, an antioxidant material, a polymer emulsion and an inorganic colloid as a binder, and a transition metal, and having a total content of alkali metal and/or alkali earth metal of not more than 20% by weight based on the weight of the antioxidant material.

7. A graphite electrode according to claim 6, wherein said antioxidant material is previously oxidized.

8. A graphite electrode according to claim 6, wherein said antioxidant material is a carbide or nitride of an element selected from the group consisting of B, Si, Ge, Sb, Ti, Sn, Al, Zr, a boron element and a silicon element.

9. A graphite electrode according to claim 6, wherein said inorganic colloid has an average particle size of not more than 100 nm.

10. A graphite electrode according to claim 6, wherein said transition metal is at least one element selected from the group consisting of Cr, W, Co, Ti and Ni.

* * * * *